(12) United States Patent
Knauf et al.

(10) Patent No.: US 10,328,725 B2
(45) Date of Patent: Jun. 25, 2019

(54) DEVICE FOR DETECTING A POSITION OF A PRINTING MATERIAL TRANSPORTED IN A PRINTING MACHINE

(71) Applicant: HEIDELBERGER DRUCKMASCHINEN AG, Heidelberg (DE)

(72) Inventors: Stefan Knauf, Heidelberg (DE); Andreas Henn, Neckargemuend (DE); Juergen Ritz, Dielheim (DE); Olaf Lorenz, Mutterstadt (DE); Thomas Schmidt, Heidelberg (DE); Stefan Muench, Heidelberg (DE); Thomas Goebel, Muehlhausen (DE); Wolfgang Kabus, Schriesheim (DE); Stephanie Weinig-Kress, Bruchsal-Heidelsheim (DE); Stefan Mutschall, Oestringen (DE); Nicklas Raymond Norrick, Eppelheim (DE); Steffen Neeb, Bensheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/718,008

(22) Filed: Sep. 28, 2017

(65) Prior Publication Data
US 2018/0093501 A1   Apr. 5, 2018

(30) Foreign Application Priority Data
Sep. 30, 2016   (DE) .................. 10 2016 219 026

(51) Int. Cl.
*B41J 2/14*      (2006.01)
*G01J 5/06*      (2006.01)
*B41J 11/00*     (2006.01)
*G06K 15/12*     (2006.01)

(52) U.S. Cl.
CPC ......... *B41J 11/0095* (2013.01); *B41J 2/1408* (2013.01); *G01J 5/06* (2013.01); *G06K 15/1219* (2013.01); *G01J 2005/068* (2013.01)

(58) Field of Classification Search
CPC ........ B41J 11/0095; B41J 2/1408; G01J 5/06; G01J 2005/068
See application file for complete search history.

(56) References Cited

U.S. PATENT DOCUMENTS

| | | | |
|---|---|---|---|
| 2011/0234675 A1* | 9/2011 | Korogi ................. | B41J 11/0095 347/16 |
| 2012/0050373 A1* | 3/2012 | Korogi ................. | B41J 11/002 347/16 |
| 2012/0139982 A1* | 6/2012 | Abe .................... | B41J 2/125 347/14 |
| 2012/0218328 A1 | 8/2012 | Hattori et al. | |
| 2014/0125729 A1* | 5/2014 | Abe .................... | B41J 11/0095 347/19 |

* cited by examiner

*Primary Examiner* — Julian D Huffman
(74) *Attorney, Agent, or Firm* — Laurence A. Greenberg; Werner H. Stemer; Ralph E. Locher (57) ABSTRACT

A device detects at least one position of at least a part of a printing material while the printing material is transported in a printing machine. The device includes an optical sensor for establishing a distance between a printing machine component and the printing material. The distance established by the optical sensor is temperature-compensated by a computer.

10 Claims, 7 Drawing Sheets

DEVICE FOR DETECTING A POSITION OF A PRINTING MATERIAL TRANSPORTED IN A PRINTING MACHINE

CROSS-REFERENCE TO RELATED APPLICATION

This application claims the benefit, under 35 U.S.C. § 119, of German Patent Application DE 10 2016 219 026.1, filed Sep. 30, 2016; the prior application is herewith incorporated by reference in its entirety.

BACKGROUND OF THE INVENTION

Field of the Invention

The present invention relates to a device, including a computer, for detecting at least one position of at least a part of a printing material while the printing material is transported in a printing machine. The device includes an optical sensor for establishing a distance between a printing machine component and the printing material.

Devices of that general kind for detecting at least one position of at least a part of a printing material are used in digital printing machines, in particular inkjet printing machines, to ensure that the printing material is transported past the print heads at a safe distance therefrom. The print heads of inkjet printing machines are very delicate and may be damaged by contact with the printing material. Thus, it is mandatory that the printing material in inkjet printing machines maintain a defined distance from the inkjet print heads. However, since the distance between the printing material and the inkjet print heads is very short, amounting to mere fractions of a millimeter, the measuring device for establishing the position of the printing material needs to operate with a high degree of accuracy. If the distance is not established correctly and the sheet-shaped printing material is actually closer to the inkjet print head, damage may occur. However, if the actual distance between the printing material and the print head is greater than the measured distance and still sufficient, the inkjet printing machine will be unnecessarily stopped, reducing the overall productivity of the machine. The device for detecting the position of the printing material therefore needs to operate with great accuracy and needs to be immune to external influences.

At present, the sensors for monitoring the distance between the printing material and the print head in an inkjet printing machine are light barriers that monitor a line parallel to a jetting cylinder to recognize when the sheet on the jetting cylinder moves too far away from the jetting cylinder and threatens to contact the print heads. The light barrier uses a dot-shaped light source and a dot-shaped receiver. A problem of that way of monitoring the distance between the printing material and the print heads or rather between the printing material and the jetting cylinder is that a correct measuring of the distance is dependent on thermal influences. Different temperature layerings, i.e. regions of different temperatures in terms of printing material, jetting cylinder, ambient air, etc. cause the light of the light barrier to be deflected. That deflection then causes the distance to be perceived as too great, causing the printing process to be stopped and affecting the performance of the inkjet printing machine because the print heads need to be lifted for safety reasons and the printing process is disrupted.

SUMMARY OF THE INVENTION

It is accordingly an object of the invention to provide a device for detecting at least one position of at least a part of a printing material while the printing material is transported in a printing machine, which overcomes the hereinafore-mentioned disadvantages of the heretofore-known devices of this general type and which is capable of detecting the position of at least a part of a printing material even if there are different temperatures at the printing material, the jetting cylinder, the grippers, etc. or in the ambient air in order to ensure reliable operation of the printing machine without any unnecessary machine stops for safety reasons while at the same time avoiding damage to the print heads.

With the foregoing and other objects in view there is provided, in accordance with the invention, a device for detecting at least one position of at least a part of a printing material while the printing material is transported in a printing machine. The device comprises an optical sensor for establishing a distance between a printing machine component and the printing material, and a computer for temperature-compensating the distance established by the optical sensor.

In accordance with the invention, it is envisaged that the distance detected by the optical sensor is temperature-compensated by using the computer. This means that temperature-related deviations during the establishment of the distance between the printing material and a machine component such as the print head or jetting cylinder are compensated for in a computational way, allowing thermal influences to be eliminated as far as possible on the computer. For this purpose, the measured distance values are subjected to temperature compensation on the computer before they are processed to control the printing machine. The temperature compensation carried out by the computer factors in temperature-related measurement deviations by using a model. This model is saved in the form of software on the computer. Based on specific characteristics of the measuring process, the model recognizes the thermal influences, allowing the thermal influence to be detected as a disturbing quantity and the measurements to be corrected by the disturbing quantity. This ensures that the correct actual distance, uninfluenced by measurement errors, is used to control the printing machine. In this way, the productivity of the printing machine is increased while ensuring that the print heads are protected against contact with the printing material. In accordance with the present invention, the correction may be made in an exclusively computational way by software on the computer. No hardware in terms of the optical sensor needs to be adapted and known light barriers may continue to be used.

In accordance with a first embodiment of the invention, it is envisaged that the optical sensor is a CCD line sensor that includes a plurality of CCD elements and the device includes a light source emitting light beams in the direction of the optical sensor, with at least parts of the printing material located in the beam path between the light source and the optical sensor. In this case, a CCD line sensor is mounted on one side of the jetting cylinder in the printing machine and a light source is present on the opposite side. Together, the CCD line sensor and the light source form a light barrier. Without thermal influences, the light beams extend in a direction parallel to the jetting cylinder and reach the CCD line sensor on the shortest path without deflection. The light beams are disposed in such a way that they are at the required safe distance from the inkjet print head. Alternatively, a partial shadowing may be envisaged, involving a known number of beams that are always shadowed. This known partial shadowing is then factored-in in a corresponding way when the light barrier is evaluated. As soon as at least parts of the printing material interrupt the beam path, it is to be assumed that the minimum distance between the light beam and the print head has been violated because at least a part of the printing material has entered the danger zone and has lifted too far off the jetting cylinder. In order to prevent damage, the computer will then either stop the machine completely or use a mechanism to lift the print heads to avoid contact with the printing material. However, different temperature layerings caused by temperature differences between jetting cylinder, printing material, and ambient air as well as grippers that guide the printing material, may deflect the light beam in an upward or downward direction. If the light beam is deflected in an upward direction, an insufficient distance from the print head located above the jetting cylinder is detected too late, resulting in a risk of damage. If the light beam is deflected in a downward direction, a penetration of the safety zone is wrongly detected even though there is still enough distance between the printing material and the print head. These two errors are corrected by the computer in the temperature compensation process, preventing a wrong reaction in the printing machine control.

In a further embodiment of the invention it is envisaged that an intensity pattern of the optical sensor is saved on the computer, the intensity pattern representing a measurement without any external thermal influences. In this case, an evaluation of the interaction between the CCD elements and the light source of the optical sensor is made without any thermal influences. This means that printing material, ambient air, grippers and jetting cylinder all have the same temperature and the light beams reach the CCD line sensor without deflection. The resultant intensity pattern is saved on the computer as a correct measurement and is later used as a reference for distance measurements during operation if deviations occur due to temperature layerings. The temperature layerings cause the light beam to be deflected in an upward or downward direction, resulting in different intensity patterns due to the thermal influences.

In accordance with the invention, it is furthermore envisaged that the computer compares the intensity patterns established by the optical sensor under thermal influences and the saved intensity pattern without thermal influence and, based on the deviation between the two patterns, calculates the thermal influence and compensates for the thermal influence in a computational way. The comparison between the measured intensity patterns and the saved intensity pattern allows the computer to detect temperature deviations because different temperature deviations result in different intensity patterns. Thus, the computer may use the intensity signal to extract the temperature information required for a correction and may take suitable compensatory measures. This compensation may, for instance, be carried out on the basis of a table that is likewise saved on the computer and indicates positive and negative correction values in terms of the printing material distance in accordance with the measured temperature information. These correction values are then added to the measured distance value to calculate the actual distance by using the computer.

In accordance with a further embodiment of the invention, it is envisaged that the height difference between the first local maximum of the saved intensity pattern and the first local maximum of the measured intensity pattern are compared in the comparison when the computer compares the intensity patterns. Prior to the comparison between the local maximums the intensity curves are filtered or smoothed on the computer if necessary. The difference between the first local maximums is clearly positive in an uninfluenced case but negative in the case of a cold surface. In this way, a temperature deviation may be detected and suitable temperature compensation may be achieved for the signal.

In a further embodiment of the present invention it is envisaged that the light source includes a lens to widen the illumination in parallel. The lens creates parallel beams from a dot-shaped light source. The light beams accordingly hit the CCD line sensor in parallel. In this way, due to the plurality of parallel light beams, a large region between the jetting cylinder and the print head may be monitored for printing material distance violations.

In an alternative embodiment of the present invention it is envisaged that the light source is dot-shaped. In this case, there is no parallel widening of the illumination but characteristic intensity curves are created on the CCD line sensor nonetheless.

Advantageously it is also envisaged that the temperature of at least parts of the printing machine in the region of the measuring operation are controlled by a temperature control device. Since temperature compensation by using the computer is limited to a few degrees Celsius, an additional temperature control device may be provided to control the temperature of at least some parts of the printing machine or printing material in the region of the measuring operation in order to reduce the measurement deviations. Targeted temperature control on printing material, jetting cylinder, grippers, or ambient air in the region of the measuring operation may minimize temperature differences, reducing the measurement deviations in the distance measurement to a considerable extent. This reduces measurement deviations in advance and thus temperature compensation only needs to be implemented over a small range. However, the provision of a suitable temperature control device is complex in terms of construction and a temperature control device will always require an energy supply.

In a further embodiment of the invention it is envisaged that the computer switches the printing machine off when the measured distance between the optical sensor and the printing material exceeds a predefined value. Switching off the printing machine prevents collisions between the printing material and the print heads. However, the printing machine does not need to be completely switched off. It is sufficient if the printing process is switched off, for instance by lifting the print heads, and if a printing material that is not at the required safe distance is not printed. Switching off the printing machine in this context simply means switching off the printing process for a printing material.

In a further embodiment of the present invention it is envisaged that the switch-off threshold is temperature-dependent. In this case, there is no compensation of the distance measuring temperature. Instead, the switch-off threshold is lowered or increased as a function of the temperature deviation established by the intensity measurement. This process in the end likewise amounts to compensated distance measurement. A modified switch-off threshold as a function of the temperature thus presents an alternative to correcting the measured distance.

In a further embodiment of the present invention it is envisaged that a cover plate is provided between the light source and the receiver. The use of the cover plate may suppress the spatial region of the steep temperature gradients. This reduces the influence of the temperature deviation. However, the position of the cover plate depends on the thickness of the printing material and thus needs to be adjusted as a function of the printing material thickness. This requires a manual or automated adjustment of the cover plate.

Advantageously, it is furthermore envisaged that the printing machine includes grippers for transporting sheet-shaped printing material and at least one temperature sensor for sensing the temperature of the grippers and forwarding it to the computer. The computer may use the temperature of the grippers sensed by one or more temperature sensors to establish the temperature-dependent modification of the switch-off threshold on the computer. Then the computer may correct the switch-off threshold as a function of the sensed gripper temperature. In a similar way, the temperature of the jetting cylinder and of the ambient air may be sensed.

Other features which are considered as characteristic for the invention are set forth in the appended claims.

Although the invention is illustrated and described herein as embodied in a device for detecting a position of a printing material transported in a printing machine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
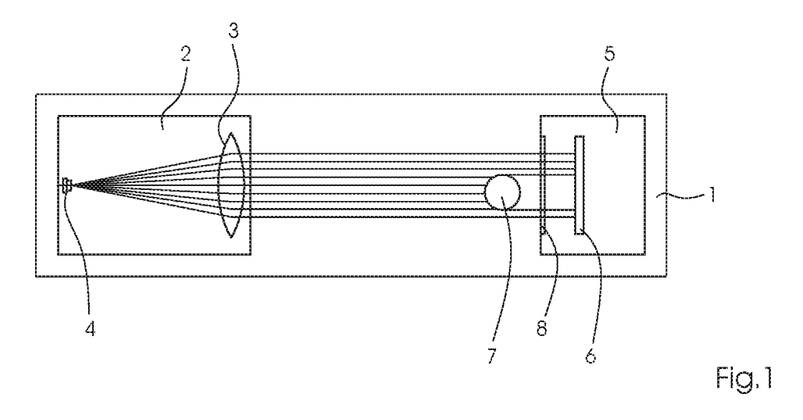
FIG. 1 is a diagrammatic view of a portion of a digital printing machine having fundamental structures illustrating a measuring principle of a distance measurement when bad sheets occur.

Referring now to the figures of the drawings in detail and first, particularly, to FIG. 1 thereof, there are seen fundamental structures for distance detection using a CCD line sensor 6 and an emitter 2 in a digital printing machine 1. By way of example, FIG. 1 shows a measuring object 7, which is a sheet 9 shown in FIG. 4, in the digital printing machine 1. For safety reasons, the distance between the sheet 9 and non-illustrated print heads in the digital printing machine 1 always needs to be large enough to avoid contact between the print heads and the sheet 9 in order to avoid damage to the print heads. The CCD line sensor 6 in FIG. 1 is integrated in a receiver 5, which additionally includes a measuring aperture 8 that allows light beams 11 (also shown in FIGS. 2, 4, 5 and 6) emitted by the emitter 2 to reach the CCD line sensor 6. The emitter 2 is substantially formed of a light source in the form of a laser diode 4 and a lens 3, which widens the beam path of the laser diode 4 and generates parallel light beams emitted in the direction of the receiver 5. When a measuring object 7 is located in the beam path, corresponding CCD elements on the CCD line sensor 6 are shadowed, allowing the width of the measuring object 7 and the position of the latter to be determined in FIG. 1. This measuring principle is used to determine the distance between the sheet 9 and the print heads in the printing machine 1.

Figure 2:
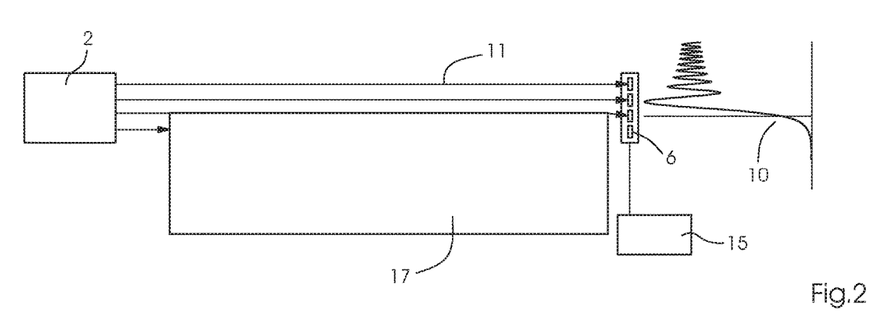
FIG. 2 is a side-elevational view illustrating an ideal intensity pattern without thermal influences on a CCD line.

FIG. 2 illustrates the implementation of the measuring principle of FIG. 1. Like FIG. 1, an emitter 2 is disposed on the left-hand side. The emitter 2 emits parallel light beams 11 that are received by a CCD line sensor 6 on the opposite side of the digital printing machine 1. The light beams 11 are emitted in a direction parallel to a jetting cylinder 17, which transports the printing material 9 during the printing operation. The jetting cylinder 17 extends from the drive side to the operator side of the printing machine, which is the reason why the emitter 2 and the receiver including the CCD line sensor 6 are likewise respectively suitably disposed on the drive and operator sides of the printing machine. The CCD line sensor 6 is furthermore connected to a computer 15, which may simultaneously be the control unit of the digital printing machine 1. In this way, the computer 15 may evaluate the light beams 11 received by the CCD line sensor 6. FIG. 2 shows that the jetting cylinder 17 shadows a part of the light beams 11. The computer 15 knows about this shadowing effect and does not react until further light beams 11 are interrupted in addition to the known partial shadowing. The partial shadowing is expedient because it has been found that the emitter 2 and the sensor 6 make more reliable evaluations in the middle range. Thus, the marginal regions are eliminated by the partial shadowing. In addition, an ideal intensity signal 10 is shown to the right of the line sensor 6 in FIG. 2. This ideal intensity signal is without any thermal influences and with a theoretical, infinite resolution.

Figure 3:
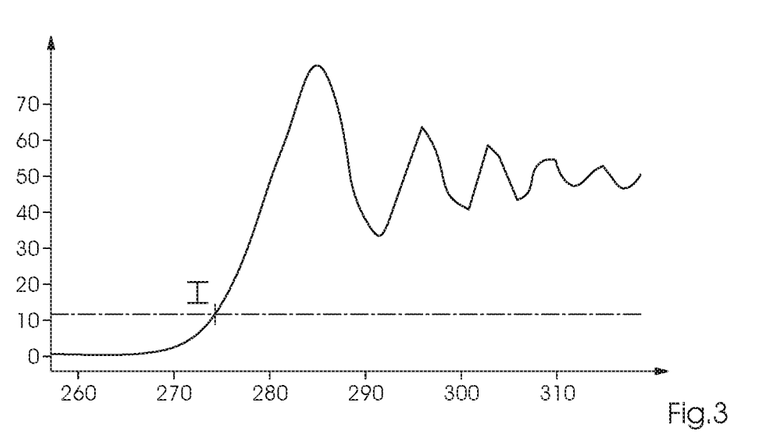
FIG. 3 is a diagram illustrating an actual intensity signal without thermal influences on a CCD sensor.

The real intensity signal is shown in FIG. 3. This real intensity signal is also not influenced by thermal effects but is based on an actual resolution of a limited number of CCD elements in the line sensor 6. The number of the respective CCD element is indicated on the X axis and the intensity (in percentages) is indicated on the Y axis. Every CCD element measures an intensity between 0 and 100%; the intersection of the line parallel to the x axis at an intensity of 12.5% and the intensity curve indicates the position of the sheet edge. The edge position I is thus located approximately at CCD element 275. Based thereon, the computer 15 may calculate the distance of the edge and the position of the edge of the sheet 9. In this way, the computer 15 receives information on the distance between the sheet 9 and the print head or rather the jetting cylinder 17 disposed to be parallel thereto, and whether or not the print heads are at risk because the minimum distance is potentially not met.

Figure 4:
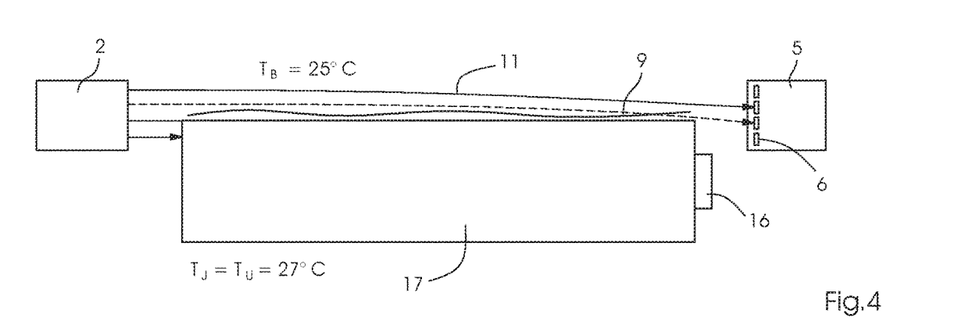
FIG. 4 is a view similar to FIG. 2 illustrating a deflection of a light beam by temperature layering effects.

In practice, the development of the intensity signal 10 on the CCD line sensor 6 is highly influenced by temperature layerings during the measuring process. The effect of this temperature layering is shown in FIG. 4. The print sheet 9 has a temperature $T_B=25°$ C. The jetting cylinder 17 has a temperature $T_J=27°$ C., and the ambient air likewise has a temperature $T_U=27°$ C. Due to the different temperatures, temperature layerings form and the light beams 11, which were originally parallel, are deflected towards the optically denser medium, i.e. in the direction of the cooler medium. Since the sheet in FIG. 4 is cooler than the ambient air, the light beams 11 are deflected in the direction of the sheet 9 and the edge of the sheet 9 is measured too low. This means that the distance of the sheet 9 may already have fallen below the required safety distance although the CCD line sensor 6 measures an acceptable distance due to the deflection of the light beams 11.

Figure 5:
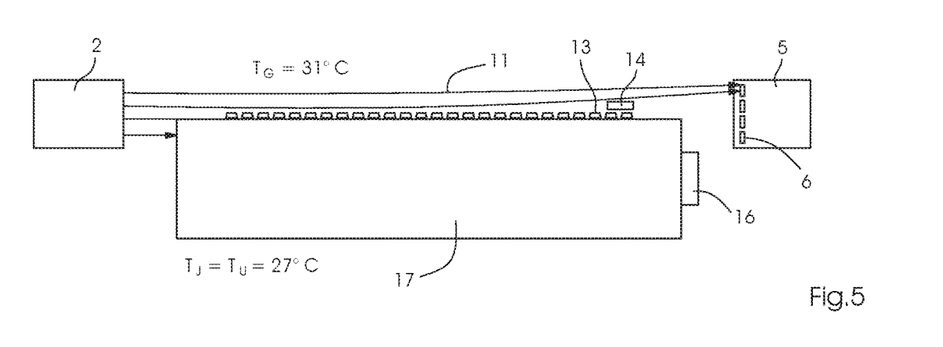
FIG. 5 is another view similar to FIGS. 2 and 4 illustrating a deflection of the light beam due to increased gripper temperatures.

The sheet grippers 13 on the jetting cylinder 17 are visible in FIG. 5. They have a comparatively high temperature $T_G$ of 31° C. The jetting cylinder 17 and the ambient air again have the same temperature of 27° C. This causes the position of the grippers 13 on the jetting cylinder 17 to be measured too high due to the higher temperature, and causes the computer 15 to wrongly deduce that the threshold is exceeded, resulting in an unnecessary switching-off of the printing process. FIG. 5 additionally shows a temperature sensor 14 for sensing the temperature $T_G$ of the grippers 13. It is to be understood that there may be multiple temperature sensors 14 to measure the temperature $T_G$ of all of the grippers 13 over the entire width of the machine. In addition, FIG. 5 shows a temperature control device 16 for influencing the temperature of the jetting cylinder 17. Such a temperature control device 16 is capable of heating and cooling to modify the temperature of the jetting cylinder 17. In this way, thermal effects may be reduced by adapting the temperature of the jetting cylinder 17 to the temperature of the grippers 13, for example.

Figure 5A:
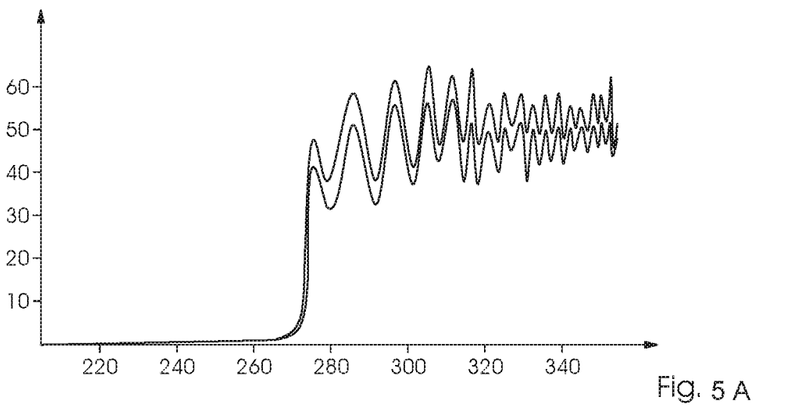
FIG. 5A is a diagram illustrating an intensity signal that has been influenced by the increased gripper temperature.

FIG. 5A illustrates how the thermal influence changes the development of the intensity 10 on the CCD line sensor 6 in a characteristic and reproducible way. The graphs of FIG. 5A indicate the deflection caused by a cold measured surface. Since the influence is reproducible, characteristic values of the curve may be found. They may be used to predict the temperature and to deduce the actual position of the edge of the sheet 9. For this purpose, the computer 15, for instance, compares the height difference between the first local maximum of the uninfluenced intensity pattern 10 saved on the computer 15 and shown in FIG. 3 and the first local maximum of the intensity pattern 10 measured under thermal influences. This may potentially require a filtering and smoothing of the curve by the computer 15. The difference between the first local maximums is clearly positive without thermal influences but negative in the case of a cold surface. In this way, the computer 15 may effect temperature compensation, allowing sheet edges of the sheet 9 to be measured and detected irrespective of thermal influences within a certain temperature range. This prevents the printing machine 1 from being unnecessarily switched off and increases the productivity of the machine.

Figure 6:
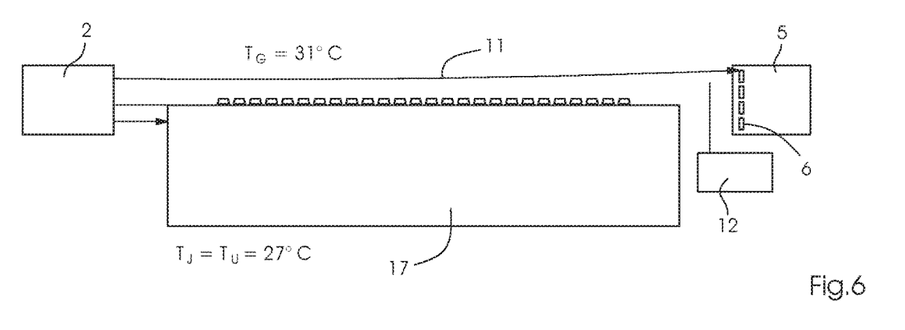
FIG. 6 is a further view similar to FIGS. 2, 4 and 5 illustrating a configuration including a cover plate in a region of temperature gradients.

In FIG. 6, a cover plate 12 is additionally disposed in front of the receiver 5. This cover plate 12 is used to eliminate the spatial region of steep temperature gradients, preventing them from reaching the CCD line sensor 6 and thus preventing strongly deflected light beams 11 from being evaluated. However, the cover plate 12 needs to be manually or automatically adjusted as a function of the thickness of the sheet 9 that is used. If the cover plate 12 is adjustable in an automated way, the computer 15 makes the adjustment as a function of the input or recognized printing material.

The invention claimed is:

1. A device for detecting at least one position of at least a part of a printing material while the printing material is transported in a printing machine, the device comprising:
   an optical sensor for establishing a distance between a printing machine component and the printing material; and
   a computer for temperature-compensating the distance established by said optical sensor;
   said computer saving an intensity pattern of said optical sensor on said computer, and said intensity pattern representing a measurement uninfluenced by external temperatures;
   said computer comparing an intensity pattern established by said optical sensor under thermal influences and said saved intensity pattern without thermal influence; and
   said computer calculating said thermal influence and compensating for said thermal influence in a computational way based on a deviation between said two patterns.

2. The device according to claim 1, which further comprises:
   a light source emitting light beams in a beam path in a direction toward said optical sensor;
   at least parts of the printing material being located in said beam path between said light source and said optical sensor; and
   said optical sensor being a CCD line sensor including a plurality of CCD elements.

3. The device according to claim 2, wherein said light source includes a lens to widen an illumination in parallel.

4. The device according to claim 2, wherein said light source is dot-shaped.

5. The device according to claim 2, which further comprises a cover plate disposed between said light source and said optical sensor.

6. The device according to claim 1, wherein said computer compares a height difference between a first local maximum of said saved intensity pattern and a first local maximum of said measured intensity pattern in said comparison of said intensity patterns carried out on said computer.

7. The device according to claim 1, which further comprises a temperature control device for controlling a temperature of at least parts of the printing machine in a region of a measuring process.

8. The device according to claim 1, wherein said computer switches the printing machine off when a measured distance between said optical sensor and the printing material exceeds a predefined value.

9. The device according to claim 8, wherein said predefined value is a temperature-dependent switch-off threshold.

10. A device for detecting at least one position of at least a part of a printing material while the printing material is transported in a printing machine, the device comprising:
    an optical sensor for establishing a distance between a printing machine component and the printing material;
    a computer for temperature-compensating the distance established by said optical sensor, said computer saving an intensity pattern of said optical sensor on said computer, and said intensity pattern representing a measurement uninfluenced by external temperatures; and
    at least one temperature sensor for measuring a temperature of grippers of the printing machine for transporting sheet-shaped printing materials, said at least one temperature sensor transmitting said measured temperature to said computer.

* * * * *